(12) United States Patent
Cavenaugh et al.

(10) Patent No.: US 10,579,319 B2
(45) Date of Patent: Mar. 3, 2020

(54) ACTIVATING A DEVICE SYSTEM WITHOUT OPENING A DEVICE COVER

(71) Applicant: Lenovo (Singapore) Pte. Ltd., Singapore (SG)

(72) Inventors: Adam Jerome Cavenaugh, Cary, NC (US); Kenneth Scott Seethaler, Raleigh, NC (US); David W. Douglas, Cary, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/993,068

(22) Filed: May 30, 2018

(65) Prior Publication Data
US 2019/0369937 A1 Dec. 5, 2019

(51) Int. Cl.
*G06F 3/14* (2006.01)
*G06F 3/0354* (2013.01)
*G06F 1/16* (2006.01)
*H04L 29/08* (2006.01)
*H04W 88/02* (2009.01)

(52) U.S. Cl.
CPC .......... *G06F 3/1423* (2013.01); *G06F 1/1616* (2013.01); *G06F 1/1671* (2013.01); *G06F 3/03547* (2013.01); *H04L 67/306* (2013.01); *H04W 88/02* (2013.01)

(58) Field of Classification Search
CPC ............................ G06F 3/1423; G06F 1/1616
See application file for complete search history.

(56) References Cited

U.S. PATENT DOCUMENTS

| 2011/0242750 | A1* | 10/2011 | Oakley | G06F 1/1637 361/679.27 |
| 2013/0321288 | A1* | 12/2013 | Adamson | G06F 3/041 345/173 |

OTHER PUBLICATIONS

"Apple Watch Activate on Wrist Raise Setting", iPhoneTricks.org, Jun. 2015.*

* cited by examiner

*Primary Examiner* — Laurence J Lee
(74) *Attorney, Agent, or Firm* — Ference & Associates LLC (57) ABSTRACT

One embodiment provides a method, including: detecting, using at least one sensor, a predetermined motion of an information handling device. An embodiment additionally receives, substantially during the predetermined motion and at an input location of the information handling device, activation input. An embodiment additionally activates, responsive to the receiving, a system associated with the information handling device. Other aspects are described and claimed.

20 Claims, 6 Drawing Sheets

ACTIVATING A DEVICE SYSTEM WITHOUT OPENING A DEVICE COVER

BACKGROUND

Information handling devices ("devices"), for example conventional laptops, laptop/tablet hybrid devices, smart phones, other clamshell devices, and the like, may be configured to power on responsive to identifying that a predetermined condition has been met. For example, a user may turn a laptop on by pressing a power button resident on the device, opening a lid of the device, and the like. Once a device is activated, a user may visualize and interact with contents displayed on a display screen associated with the device (e.g., a primary display screen generally located on an inner surface of the lid of the device, etc.).

BRIEF SUMMARY

In summary, one aspect provides a method, comprising: detecting, using at least one sensor, a predetermined motion of an information handling device; receiving, substantially during the predetermined motion and at an input location of the information handling device, activation input; and activating, responsive to the receiving, a system associated with the information handling device.

Another aspect provides an information handling device, comprising: an input location; at least one sensor; a processor; a memory device that stores instructions executable by the processor to: detect a predetermined motion of the information handling device; receive, substantially during the predetermined motion and at the input location, activation input; and activate, responsive to the receiving, a system associated with the information handling device.

A further aspect provides a product, comprising: a storage device that stores code, the code being executable by a processor and comprising: code that detects a predetermined motion of an information handling device; code that receives, substantially during the predetermined motion and at an input location of the information handling device, activation input; and code that activates, responsive to the receiving, a system associated with the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional methods of activating a device, particularly a laptop or another clamshell style device, require an individual to first open a lid of the device. In some instances, opening the lid of the device will automatically activate the system of the device. In other instances, a user may be required to actuate a power button that may be resident on an inner surface of the device (e.g., a power button that is on the same surface as an integral keyboard of the device, etc.) to power on the system.

The requirement to open the lid of a device in order to interact with the system contents may be burdensome, time-consuming, and in some situations, impractical. For example, a user in a rush may wish to access the contents on a laptop they are holding. If the user is walking briskly it would be difficult to open the laptop lid and power on the laptop while the user is maintaining their rushed pace. In another example, a user may desire to discretely check information on their computer. Using conventional methods, the user would at least be required to open the lid of their laptop and may also be required to perform additional functions (e.g., interact with a power button, input a password, etc.) prior to accessing the information, all of which do not aid in discretion of access.

Accordingly, an embodiment provides a method for activating a system of a device without opening a lid of the device. In an embodiment, a predetermined motion (e.g., a raising motion, no motion at all, etc.) of a closed device may be detected by at least one sensor of the device (e.g., an accelerometer, a gyroscope, etc.). An embodiment may thereafter receive, during duration of the predetermined motion and at an input location of the closed device (e.g., at a touch optimized external display, at an external touch window operatively coupled to an internal display, a predetermined area on the device optimized for gesture input, etc.), an activation input (e.g., a swipe input, a swipe gesture, etc.). In an embodiment comprising an external display, the external display may be resident on an outside cover of the lid (e.g., at a periphery of the lid proximate to the hinges, etc.). In an embodiment comprising an internal display, the internal display may be resident on an inner surface of the device (e.g., an internal display may be positioned on the C-cover of the device on the same surface as an integral keyboard, etc.). An embodiment may then activate, responsive to receiving the activation input during the predetermined motion, a system of the device. An embodiment may also display system contents on the external or internal display and may be capable of receiving and processing user inputs (e.g., touch inputs, stylus inputs, gesture inputs, button inputs, etc.) provided to the internal or external display. Such a method and device may allow a user to access and interact with the contents of a system more easily.

The illustrated example embodiments will be best understood by reference to the figures. The following description is intended only by way of example, and simply illustrates certain example embodiments.

Figure 1:
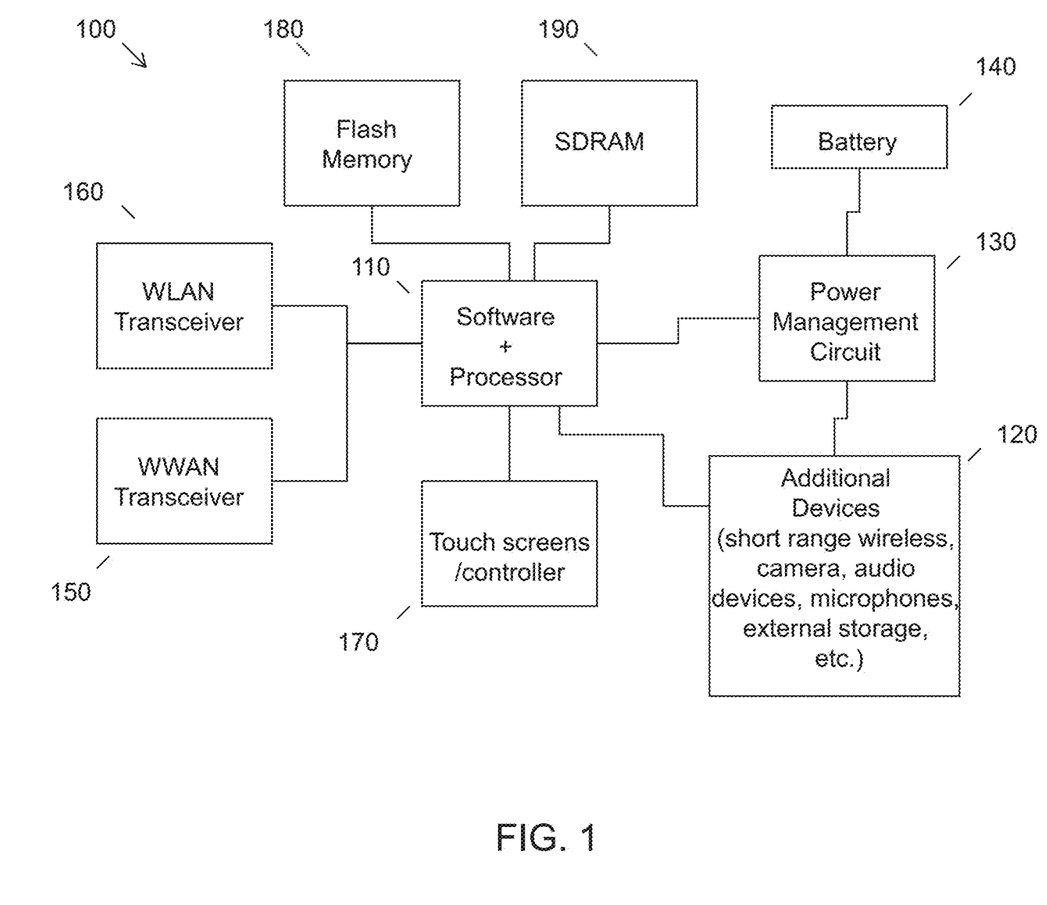
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
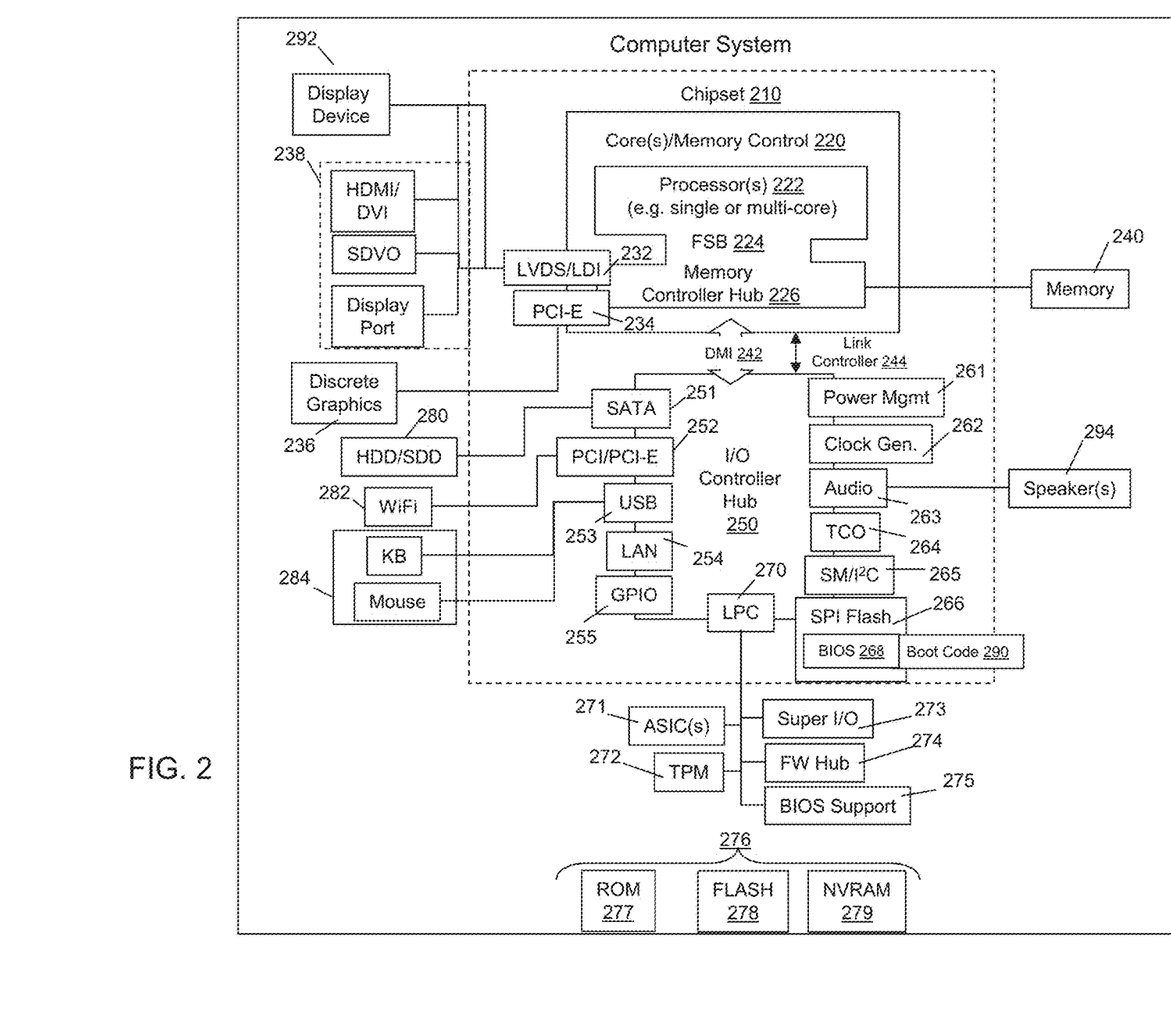
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, smart phones, hybrid devices, and/or electronic devices that may comprise a clamshell structure and have an external display capable of being interacted with when a lid of the electronic device is closed. For example, the circuitry outlined in FIG. 1 may be implemented in a tablet or smart phone embodiment, whereas the circuitry outlined in FIG. 2 may be implemented in a laptop embodiment.

Figure 3:
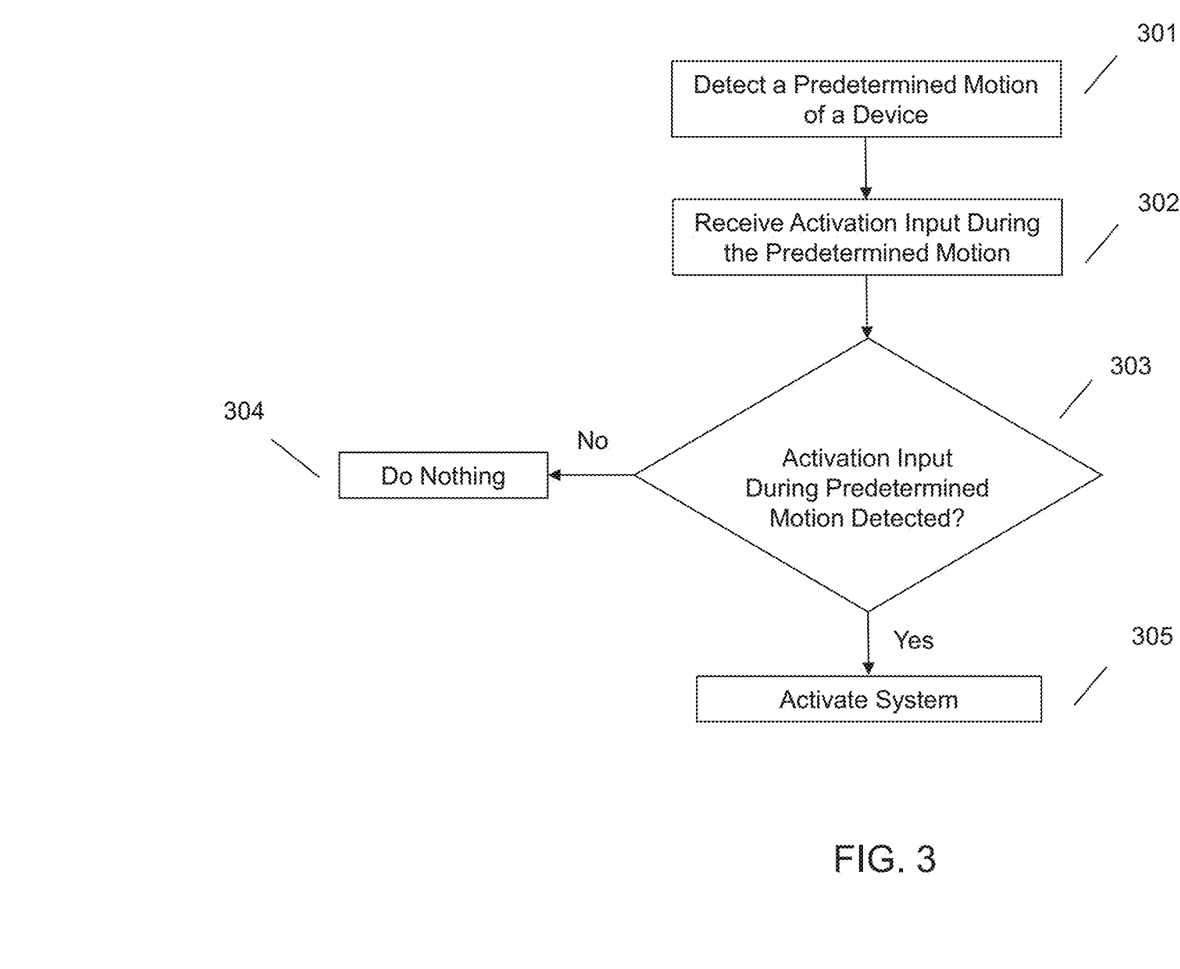
FIG. 3 illustrates an example method of activating a system of a device.

Referring now to FIG. 3, an embodiment may activate a system of a closed device once a predetermined motion of the device has been detected and an activation input has been received at an input location during, or immediately after, the predetermined motion. At 301, an embodiment may detect a predetermined motion of a closed device. In an embodiment, the predetermined motion may be virtually any motion pattern of the device either programmed by a manufacturer or set by a user. In some embodiments, the predetermined motion may be no motion at all for a predetermined period of time (e.g., 10 seconds, 30 seconds, 1 minute, etc.). For simplicity purposes, the majority of the discussion herein will involve a raising motion of the device, however, it should be understood that this is not limiting and other predetermined motions may be detected. A raising motion may be, for example, a motion that raises the device from a lower point in space to a higher point in space. In an embodiment, the raising motion may be detected using one or more sensors integral or operatively coupled to the device such as accelerometers, gyroscopes, image and/or video capture devices, and the like.

In an embodiment, the device may be virtually any device having a clamshell-like structure (e.g., a laptop, a smart phone, a laptop/tablet hybrid, etc.). Embodiments of this disclosure are presented herein with the assumption that a lid of the device is closed. More particularly, a closed-lid orientation of the device may be one in which a primary display of the device is not visible to a user (e.g., because the primary display is disposed on an inside surface of the lid, etc.).

Figure 4:
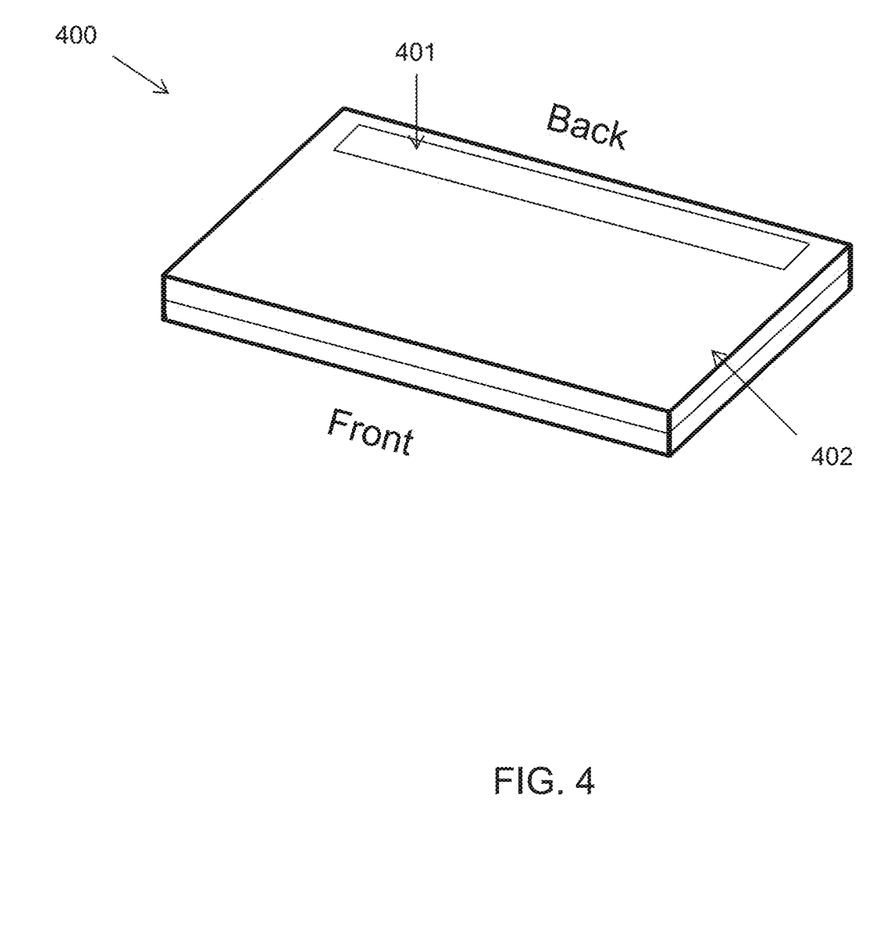
FIG. 4 illustrates a top view of an example embodiment of a closed device comprising an external display.

In an embodiment, the device may comprise a touch optimized external display disposed on an outer surface of the lid. For example, referring now to FIG. 4, an example embodiment of a clamshell-like device 400 in a closed orientation having an external display 401 disposed on an outer surface of a lid 402 is illustrated. It is important to note that although the external display 401 illustrated in FIG. 4 is positioned at a rear peripheral edge of the device 400, this is a non-limiting location and the external display 401 may be positioned at other locations on the lid 402 (e.g., a front peripheral edge, a central portion of the lid, a side edge of the lid, etc.). Additionally, although the external display 401 illustrated in FIG. 4 appears as a long rectangle, this is a non-limiting shape and the external display 401 may take the form of another size and shape that is compatible with the dimensions of the lid 402.

Figure 5:
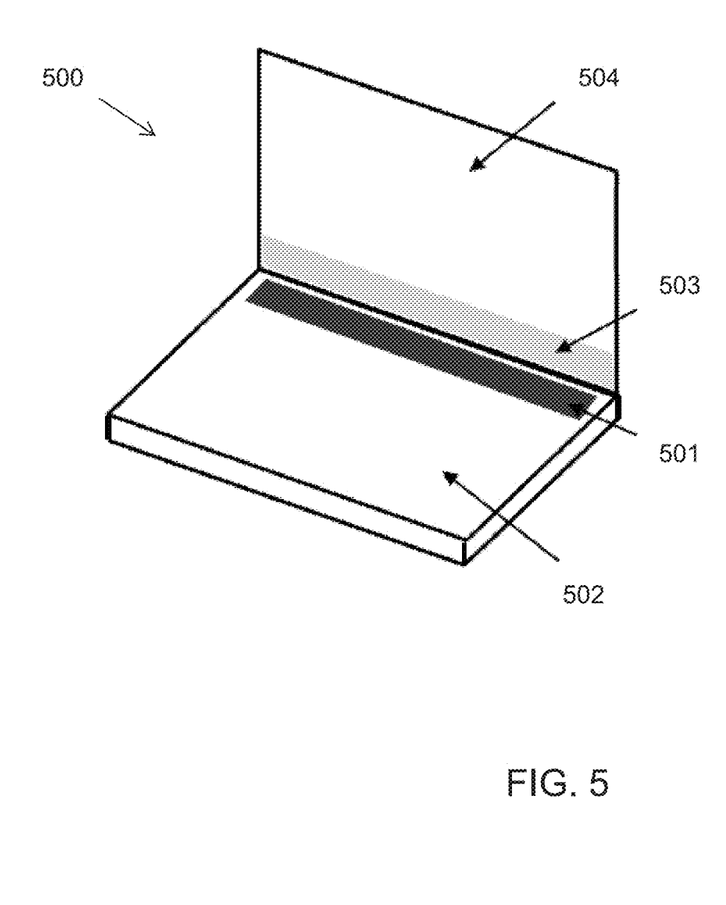
FIG. 5 illustrates an example embodiment of a device in an open orientation comprising an internal display.
Figure 6:
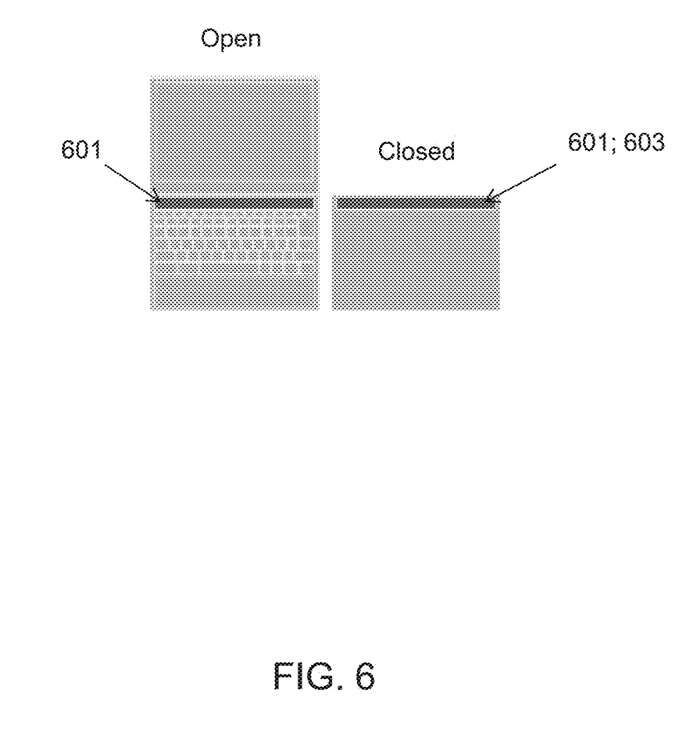
FIG. 6 illustrates an example embodiment of a device in a closed orientation comprising an internal display.

In another embodiment, the device may comprise an auxiliary internal display disposed on an inner cover of the device (e.g., the C-cover, etc.). In an embodiment, the internal display may be visible to a user through a transparent window on the lid. For example, referring now to FIG. 5, an example embodiment is illustrated of a clamshell-like device 500 in an open orientation having an internal display 501 disposed on an internal surface 502 of the device 500. The device 500 may have a transparent window 503 resident on the lid 504 of the device 500 through which a user may view the contents of the internal display 501 when the device 500 is in a closed orientation. In an embodiment, the transparent window 503 may have equivalent dimensions to the internal display 501 or, alternatively, may have different dimensions greater or less than that of the internal display 501. Referring now to FIG. 6, an alternative view of the device 500 of FIG. 5 is provided in an open and closed orientation. As can be seen from FIG. 6, the internal display 601 is clearly visible through the transparent window 603 in the closed orientation.

It is important to note that although the internal display in FIGS. 5 and 6 is positioned at a top portion of the inner cover (e.g., above the keyboard, etc.), this is a non-limiting location and the internal display 501 may be positioned at other locations on the inner surface 501 (e.g., below the keyboard, on the side of the keyboard, etc.). Additionally, although the internal display 501 illustrated in FIG. 5 appears as a long rectangle, this is a non-limiting shape and the internal display 501 may take the form of another size and shape that is compatible with the dimensions and layout of the surface. The same may be true for the location and size of the corresponding transparent window.

In an embodiment, an input surface associated with the internal or external display may be always active while other input devices and/or functions of the system are inactive. Alternatively, in an embodiment, an input surface associated with the internal or external display may activate only once a predetermined condition has been identified (e.g., when a predetermined motion has been detected, etc.). Such an embodiment may allow a user to provide inputs to the internal or external display substantially during the predetermined motion. In an embodiment, the internal or external display may remain active for a predetermined period of time after being activated (e.g., 10 seconds, 30 seconds, 1 minute, 5 minutes, etc.).

At 302, an embodiment may receive an activation input at an input location of the device. In an embodiment, the activation input may comprise touch input and may be virtually any predetermined touch input pattern. In another embodiment, the activation input may comprise a combination of touch input and another input type (e.g., voice input, gaze confirmation, etc.). For simplicity purposes, the majority of the discussion herein will involve a touch swipe input, however, it should be understood that this is not limiting and other activation inputs may be received (e.g., voice input, gesture input, hard or soft button press input, etc.). In an embodiment, a swipe input may be a swipe of one or more of a user's fingers on the external display in a predetermined direction (e.g., a swipe of the thumb and/or fingers on the external display toward the user's palm, etc.). Alternatively, with respect to an internal display, the transparent window may be a transparent touch pad that is configured to receive touch input. Touch input provided to the transparent touch pad may thereafter be processed by the system. Accordingly, a swipe input for a device having an internal display may be a swipe of one or more of a user's fingers on the transparent touch pad in a predetermined direction (e.g., a swipe of the thumb and/or fingers on the transparent touch pad toward the user's palm, etc.).

In an embodiment, the activation input may be received substantially during the predetermined motion (e.g., a user may provide swipe input while raising the device, etc.). In another embodiment, the activation input may be received within a predetermined time window of completion of the predetermined motion (e.g., a user may provide swipe input within 1 second, 3 seconds, etc. of the device having been fully raised, etc.). Responsive to identifying that the activation input was not received during the predetermined motion or within the predetermined time window, an embodiment may not activate the system.

An embodiment may further require the activation input to be received at a predetermined portion of the external display or the transparent touch pad. For example, an embodiment may require a user to provide the activation input in a predefined zone or quadrant of the external display or transparent touch pad (e.g., a left portion of the external display or transparent touch pad, a right portion of the external display or transparent touch pad, a corner of the external display or transparent touch pad, etc.). An embodiment may not activate the system unless the activation input is detected within the predetermined portion.

In an embodiment, the predetermined motion may be no motion at all. More particularly, an embodiment may determine that a device has been resting on a surface for a predetermined period of time (e.g., 10 seconds, 30 seconds, 1 minute, etc.) and is therefore motionless. Responsive to this determination, an embodiment may require that the activation input be provided to a predetermined portion of the external display or transparent touch pad to activate the system. For example, a user sitting in a meeting may have their laptop resting on a table. Instead of requiring the user to pick their laptop up and perform a raising motion, an embodiment may instead detect that the laptop has been resting on the table for a predetermined amount of time and may therefore only require the user to provide the activation input to the right side of the external display or transparent touch pad to activate the system.

Responsive to determining, at 303, that the activation input was received substantially during, or immediately after, the predetermined motion, an embodiment may activate, at 305, a system associated with the device. Conversely, responsive to determining, at 303, that the activation input was not received substantially during, or immediately after, the predetermined motion, an embodiment may, at 304, do nothing. Alternatively, an embodiment may provide a notification (e.g., audible notification, textual notification, a combination thereof, etc.) that the activation input has not been recognized and/or that the activation input was not provided to the correct portion of the external display or transparent touch pad.

At 305, responsive to receiving the activation input during the predetermined motion, an embodiment may activate a system associated with the device. In an embodiment, the activation of the system may correspond to the powering on of the system. Additionally or alternatively, the activation of the system may correspond to the display of contents on the internal or external display of the device. An embodiment may receive and process one or more user control inputs on the contents displayed by the internal or external display. For example, using the transparent touch pad or external display, a user may access data files, actuate media buttons, browse the Internet, communicate with other individuals, and the like. In an embodiment, one or more other display screens of the device may be maintained in a sleep or off state while the internal or external display outputs the system contents. For example, a primary display screen of the device (e.g., located on the inside cover of the lid, etc.) may remain powered off while the internal or external display shows system contents.

In an embodiment, one or more user-specific settings and permissions may be automatically initiated and granted depending on the activation input type and/or location where the activation input is received. For example, a user providing a generic activation input may activate the system, which the user may interact with via the transparent touch pad or external display to perform general functions (e.g., browse the internet, view public files, etc.). However, multiple users may access and use a single device, some of which may desire to have a customized internal or external display graphical user interface (GUI) and/or may desire to keep certain information private from other users. In such a situation, an embodiment may store (e.g., on the device, in a remote storage location, etc.) one or more user profiles, each of which may comprise user-specific display settings and/or data that is specific to the authorized user. To obtain access to a user profile, an embodiment may require a specific type of activation input to be received at a specific portion of the transparent touch pad or external display.

Responsive to receiving the specific activation input type at the specific portion, an embodiment may activate a corresponding user profile. For example, User A may gain access to a user profile on the device by providing a circle drawing input to the left side of the external display. Subsequent to determining that the activation input (i.e., the type and location of the input) is specific to User A, an embodiment may automatically load one or more preferences stored in a user profile associated with User A. For instance, User A may have preconfigured the external display to display a particular image or assume a particular GUI that is specific to User A. Additionally or alternatively, User A may be able to view and interact with documents that are "private" and not visible to other, unauthorized users.

In an embodiment, a user may deactivate the system in much the same way they activated the system. More particularly, a user may deactivate the system by performing another predetermined motion (i.e., a deactivating motion) coupled with a deactivation input provided to the transparent touch pad or external display. In an embodiment, the deactivating motion and deactivation input may be virtually any motion pattern and input sequence either programmed by a manufacturer or set by a user. For example, the deactivating motion may be directly opposite that of the predetermined activating motion. For instance, if the activating motion is a raising of the device, the deactivating motion may be a lowering of the device. Similarly, if the activation input comprises a swipe of a user's fingers toward their palm, the deactivation input may comprise a swipe of a user's fingers away from their palm. As with the activating motion, the deactivating motion may be no motion at all detected for a predetermined period of time (e.g., 10 seconds, 30 seconds, 1 minute, etc.). The aforementioned deactivating motions and deactivation inputs are not intended to be limiting and other motions and input sequences may be used. In an embodiment, the deactivation of the system may correspond to one or more of the shutting down of the device, the removal of contents from the internal or external display, and the logging out of a user profile.

The various embodiments described herein thus represent a technical improvement to conventional system activation techniques. Using the techniques described herein, an embodiment may detect a predetermined motion of a device and may receive, at an input location of the device, an activation input substantially during or immediately after the predetermined motion while the device is in a closed-lid orientation. Responsive to receiving and/or identifying these two events, an embodiment may activate a system associated with the device and/or provide, on an internal or external display, a user interface. Such techniques may allow a user to quickly activate a system without opening a lid of a device and to interact with system contents via user inputs to the external display.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using at least one sensor, a predetermined motion of an information handling device, wherein the information handling device comprises a lid that is in a closed state during detection of the predetermined motion;
    receiving, substantially during the predetermined motion and at an input location of the information handling device and while the lid is in the closed state, activation input; and
    activating, responsive to the receiving, a system associated with the information handling device.

2. The method of claim 1, wherein the input location is associated with an external display disposed on a lid of the information handling device.

3. The method of claim 1, wherein the input location is associated with a transparent touch pad disposed on a lid of the information handling device through which an internal display disposed on an inner surface of the information handling device is visible.

4. The method of claim 3, wherein the transparent touch pad is configured to receive user input that affects the internal display.

5. The method of claim 1, wherein the activating comprises activating the system responsive to receiving the activation input at a predetermined portion of the input location.

6. The method of claim 1, wherein the predetermined motion is associated with no motion for a predetermined amount of time and wherein the activating comprises activating the system responsive to receiving the activation input at a predetermined portion of the input location.

7. The method of claim 1, further comprising displaying, responsive to the activating, contents on one of: an internal display or an external display of the information handling device.

8. The method of claim 7, further comprising maintaining, during the displaying, another display of the information handling device in a deactivated state.

9. The method of claim 1, further comprising deactivating the system responsive to:
    detecting, using the at least one sensor, another predetermined motion of the information handling device; and
    receiving, during the another predetermined motion, user deactivation input.

10. The method of claim 1, further comprising identifying that the predetermined motion and the activation input correspond to a user profile and thereafter implementing, based on the identifying, one or more settings associated with the user profile.

11. An information handling device, comprising:
    an input location;
    at least one sensor;
    a processor;
    a memory device that stores instructions executable by the processor to:
    detect a predetermined motion of the information handling device, wherein the information handling device comprises a lid that is in a closed state during detection of the predetermined motion;
    receive, substantially during the predetermined motion and at the input location and while the lid is in the closed state, activation input; and
    activate, responsive to the receiving, a system associated with the information handling device.

12. The information handling device of claim 11, wherein the input location is associated with an external display disposed on a lid of the information handling device.

13. The information handling device of claim 11, wherein the input location is associated with a transparent touch pad disposed on a lid of the information handling device through which an internal display disposed on an inner surface of the information handling device is visible.

14. The information handling device of claim 13, wherein the transparent touch pad is configured to receive user input that affects the internal display.

15. The information handling device of claim 11, wherein the instructions executable by the processor to activate comprise instructions executable by the processor to activate the system responsive to receiving the activation input at a predetermined portion of the input location.

16. The information handling device of claim 11, wherein the predetermined motion is associated with no motion for a predetermined amount of time and wherein the instructions executable by the processor to activate comprise instructions executable by the processor to activate the system responsive to receiving the activation input at a predetermined portion of the input location.

17. The information handling device of claim 11, wherein the instructions are further executable by the processor to display, responsive to the activating, contents on one of: an internal display or an external display of the information handling device.

18. The information handling device of claim 11, wherein the instructions are further executable by the processor to deactivate the system responsive to:
   detecting another predetermined motion of the information handling device; and
   receiving, during the another predetermined motion, user deactivation input.

19. The information handling device of claim 11, wherein the instructions are further executable by the processor to identify that the predetermined motion and the activation input correspond to a user profile and thereafter implement, based on the identifying, one or more settings associated with the user profile.

20. A product, comprising:
   a storage device that stores code, the code being executable by a processor and comprising:
   code executable by the processor to detect a predetermined motion of an information handling device, wherein the information handling device comprises a lid that is in a closed state during detection of the predetermined motion;
   code executable by the processor to receive, substantially during the predetermined motion and at an input location of the information handling device and while the lid is in the closed state, activation input; and
   code executable by the processor to activate, responsive to the receiving, a system associated with the information handling device.

\* \* \* \* \*